United States Patent
Edwin et al.

(10) Patent No.: US 11,200,646 B2
(45) Date of Patent: Dec. 14, 2021

(54) COMPENSATION FOR DEFORMATION IN HEAD MOUNTED DISPLAY SYSTEMS

(71) Applicant: Magic Leap, Inc., Plantation, FL (US)

(72) Inventors: Lionel Ernest Edwin, Plantation, FL (US); Samuel A. Miller, Hollywood, FL (US); Etienne Gregoire Grossmann, Menlo Park, CA (US); Brian Christopher Clark, Palo Alto, CA (US); Michael Robert Johnson, Plantation, FL (US); Wenyi Zhao, Weston, FL (US); Nukul Sanjay Shah, Plantation, FL (US); Po-Kang Huang, Sunnyvale, CA (US)

(73) Assignee: Magic Leap, Inc., Plantation, FL (US)

(*) Notice: Subject to any disclaimer, the term of this patent is extended or adjusted under 35 U.S.C. 154(b) by 0 days.

(21) Appl. No.: 17/129,645

(22) Filed: Dec. 21, 2020

(65) Prior Publication Data
US 2021/0217147 A1 Jul. 15, 2021

Related U.S. Application Data

(60) Provisional application No. 62/961,630, filed on Jan. 15, 2020, provisional application No. 63/044,165, filed on Jun. 25, 2020.

(51) Int. Cl.
*G06T 5/00* (2006.01)
*G06T 3/00* (2006.01)
(Continued)

(52) U.S. Cl.
CPC .......... *G06T 5/006* (2013.01); *G02B 27/0172* (2013.01); *G06T 3/0068* (2013.01);
(Continued)

(58) Field of Classification Search
CPC .................. G06T 5/006; G06T 3/0068; G06T 2207/10024; H04N 13/344; H04N 5/2253;
(Continued)

(56) References Cited

U.S. PATENT DOCUMENTS 8,576,143 B1 * 11/2013 Kelly .................. G02B 27/017 345/8
8,736,636 B2 5/2014 Kang
(Continued)

OTHER PUBLICATIONS

Deformed Defintion, Google Search, Aug. 19, 2021, 3 pages. (Year: 2021).*
(Continued)

*Primary Examiner* — Jeffery A Brier
(74) *Attorney, Agent, or Firm* — Fish & Richardson P.C.

(57) ABSTRACT

The systems and methods described can include approaches to calibrate head-mounted displays for improved viewing experiences. Some methods include receiving data of a first target image associated with an undeformed state of a first eyepiece of a head-mounted display device; receiving data of a first captured image associated with deformed state of the first eyepiece of the head-mounted display device; determining a first transformation that maps the first captured image to the image; and applying the first transformation to a subsequent image for viewing on the first eyepiece of the head-mounted display device.

17 Claims, 4 Drawing Sheets

(51) Int. Cl.
  *H04N 13/344* (2018.01)
  *G02B 27/01* (2006.01)
  *H04N 5/225* (2006.01)
(52) U.S. Cl.
  CPC ..... *H04N 13/344* (2018.05); *G02B 2027/014* (2013.01); *G02B 2027/0138* (2013.01); *G02B 2027/0178* (2013.01); *G06T 2207/10024* (2013.01); *H04N 5/2253* (2013.01)
(58) Field of Classification Search
  CPC .............. H04N 13/327; G02B 27/0172; G02B 2027/0138; G02B 2027/014
  See application file for complete search history.

(56) References Cited

U.S. PATENT DOCUMENTS

| | | | |
|---|---|---|---|
| 8,793,770 | B2 | 7/2014 | Lim |
| 8,823,855 | B2 | 9/2014 | Hwang |
| 8,874,673 | B2 | 10/2014 | Kim |
| 2013/0038510 | A1* | 2/2013 | Brin .................... G02B 27/017 345/8 |
| 2013/0120224 | A1* | 5/2013 | Cajigas .................... G09G 5/00 345/8 |
| 2014/0375681 | A1* | 12/2014 | Robbins ............... G01B 11/272 345/633 |
| 2017/0353714 | A1* | 12/2017 | Poulad ................ H04N 13/383 |
| 2019/0208187 | A1* | 7/2019 | Danziger ............. H04N 13/344 |

OTHER PUBLICATIONS

Undeformed Defintion, Google Search, Aug. 19, 2021, 2 pages. (Year: 2021).*
Transformed Defintion, Google Search, Aug. 19, 2021, 3 pages. (Year: 2021).*
Untransformed Defintion, Google Search, Aug. 19, 2021, 2 pages. (Year: 2021).*
PCT International Search Report and Written Opinion in International Appln. No PCT/US2020/066485, dated May 27, 2021, 12 pages.

* cited by examiner

COMPENSATION FOR DEFORMATION IN HEAD MOUNTED DISPLAY SYSTEMS

CROSS-REFERENCE TO RELATED APPLICATIONS

This application claims the benefit under 35 U.S.C. § 119(e) of U.S. Patent Application No. 62/961,630, entitled "COMPENSATION FOR DEFORMATION IN HEAD-MOUNTED DISPLAY SYSTEMS" filed Jan. 15, 2020, and U.S. Patent Application No. 63/044,165, entitled "COMPENSATION FOR DEFORMATION IN HEAD-MOUNTED DISPLAY SYSTEMS" filed Jun. 25, 2020, both of which are incorporated herein by reference in their entirety.

TECHNICAL FIELD

This specification generally relates to image processing and display alignment calibration for head-mounted displays.

BACKGROUND

As head-mounted display systems become lighter in weight, thinner, and more flexible to facilitate transportation, comfort, and aesthetics, these wearable devices have also become more susceptible to deformation. If the system is not structurally stable, then the displays move, deform, and become misaligned. These deformations introduce distortions and other error into the virtual binocular image. When this happens, a human perceiving an image on the display may be confused or uncomfortable. This creates a poor viewing experience.

SUMMARY

Innovative aspects of the subject matter described in this specification relate to calibration of head-mounted display devices used in virtual or augmented reality (VAR) systems. In particular, VAR systems can be used to display virtual content to augment physical reality views. When one or more display-related components of the VAR system are deformed or are not operating as desired, calibration may be required to ensure that the virtual content is being displayed properly.

In some cases, a transparent display is used which allows virtual content in the form of an image to be shown superimposed with a view of a real-world environment. If one display deforms, the virtual content is moved relative to the user's eye according to the deformation. If not accounted for, the user's perception of the image in relation to the real-world environment will be incorrect. This can be perceived as two separate images or double vision by a person—one image for each eye. Instead of seeing the intended single image, a user would see two images distinctly with space between them. This can result in an uncomfortable viewing experience.

Studies show that binocular misalignments can cause physiological strain on the human visual system, and that humans are sensitive to binocular rotational misalignment of virtual images about the Pitch, Roll, and Yaw axes down to 2 arcminutes. For example, in some cases, a pitch of 2 arc-minutes of one eye display relative to the other eye display is enough to cause discomfort. Furthermore, deformation in one display may cause individual color channels of the display (e.g., red, green, and blue channels) to become shifted relative to each other.

The systems and methods described in this specification operate to mitigate or prevent this uncomfortable viewing experience. This is achieved using a calibration process to determine an image transformation for a left eye display and an image transformation for a right eye display. The calibration process is configured to display an image on each of the two eye displays (also referred to as eyepieces), one for each eye, observe how the image of each eye display changes in response to deformation of each display, and determine a transformation (e.g., a mapping or Look Up Table (LUT)) for each display. The transformation associated with the left eye display is then applied to each subsequent image to be shown on the left eye display and, similarly, the transformation associated with the right eye display is then applied to each subsequent image to be shown on the right eye display. The calibration process is then repeated as needed (e.g., when deformation is detected), when triggered (e.g., by an eye blink), or periodically (e.g., every second). In some cases, the transformations for each eye display are determined together and/or are dependent on each other. However, in some cases the transformation is determined and applied to the display associated with one eye.

The calibration technique is advantageous because it allows each display to be recalibrated independently and does not require any input by the human operator. Another advantage is that it allows the physical hardware to be lightweight and compact. For example, the head-mounted display can be implemented in a small form factor such as a pair of glasses. This enables the device to allow for deformations and yet correct any issues with the display caused by this deformation in near real-time (e.g., within 100 milliseconds).

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1A:
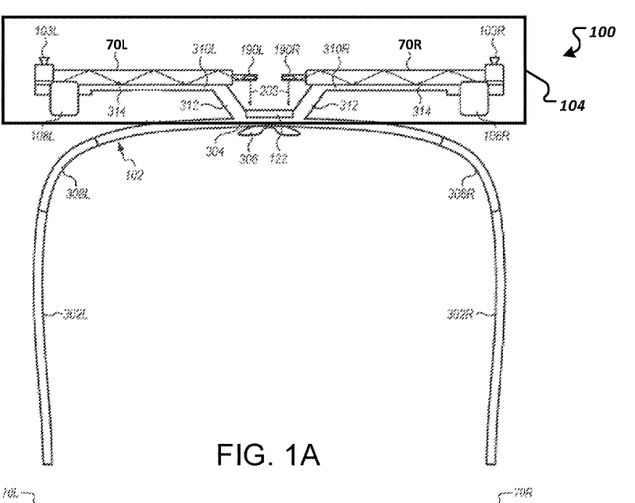
FIGS. 1A-1B depict a wearable frame for a head-mounted display in an undeformed state.
Figure 1B:
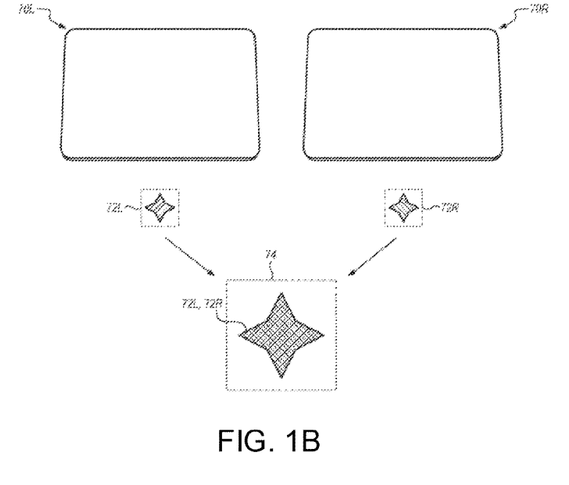

FIGS. 1A and 1B illustrate a head-mounted display device 100 of a VAR system in an undeformed or ideal state. FIG. 1A shows a top view of the head-mounted display device 100 with aligned left and right eyepieces (or displays) 70L, 70R, respectively. Virtual content may be presented and perceived through the pair of eyepieces 70L, 70R to left and right eyes, respectively, as part of a virtual image generation system.

FIG. 1B illustrates left and right monocular virtual content 72L, 72R, as binocularly-aligned virtual content 74, through the two eyepieces 70L, 70R to the user's eyes. FIG. 1B shows the head-mounted display device 100 in the undeformed state. When the two eyepieces 70L, 70R are in the undeformed state, the monocular virtual content 72L, 72R combines to produce proper binocularly-aligned virtual content 74 as shown. This is represented by the perfectly overlapping left and right monocular virtual content 72L, 72R in the virtual content 74.

The VAR system may be operated as an augmented reality or mixed reality system that can provide images of virtual objects intermixed with physical objects in a field of view of the user, such that the virtual object(s) appear as though they are present in the physical environment of the user. It may be desirable to spatially position various virtual objects relative to respective physical objects in a field of view of the user. Projection assemblies (also referred to as projectors) 108L, 108R of the head-mounted display device 100 project the virtual objections onto the eyepieces 70L, 70R for display. Virtual objects may be referred as virtual tags, tags, or call outs, and may be implemented in a variety of suitable forms.

Examples of virtual objects may include, but are not limited to, a virtual text object, a virtual numeric object, a virtual alphanumeric object, a virtual tag object, a virtual field object, a virtual chart object, a virtual map object, a virtual instrumentation object, or a virtual visual representation of a physical object. For example, the VAR system can determine when a user is viewing an empty chair in a room and project an image representing a person sitting in the chair to each eyepiece 70L, 70R associated with each eye of the head-mounted display device 100, such that the user perceives that virtual person is sitting in the actual chair in the room.

As shown in FIGS. 1A and 1B, the two eyepieces 70L, 70R are aligned with each other in an ideal or undeformed manner. In other words, the alignment of the two eyepieces 70L, 70R has not changed since the time of manufacture of the head-mounted display device 100. For example, in the case of viewing a person in a chair as described above, each of the two eyepieces 70L, 70R would display monocular virtual content 72L, 72R of the person sitting in the chair. The user would perceive the combination of this virtual content as the virtual content 74.

This is important for 3D perception since a user's brain may not properly associate a singular monocular image with 3D depth information. However, the user's brain may properly associate two monocular images that are properly aligned with 3D depth information to give the illusion that the user is viewing a 3D object positioned a distance from the user. For example, this could give the illusion that the person is sitting in the chair at a certain distance from the user although the image of the person is on the eyepieces 70L, 70R—less than one inch from the user's eyes.

The head-mounted display device 100 includes a wearable frame 102 that mounts to a user's head during use. The wearable frame 102 includes left and right temple arms 302L, 302R that are positionable over the user's left and right ear, respectively. A nose piece 306 is provided to comfortably allow the wearable frame 102 to rest against the nose of the user. The wearable frame 102 is preferably made of injection molded plastic to remain lightweight.

The wearable frame 102 two cantilever arm portions 312 extending away from a bridge 304. The cantilever arm portions 312 provides an elastic mounting of a display subsystem 104 that is intended to be positioned above the nose and in front of the eyes of the user, similar to the position of lenses of eye glasses. The cantilever arm portions 312 connect to left and right cantilevered arms 310L, 310R. Each left and right cantilevered arms 310L, 310R, include an affixation arm portion 314 that extends from the respective cantilever arm portion 312 in a plane parallel to the plane of the eyes of the end user.

Left and right eyepieces 70L, 70R are respectively affixed to the affixation arm portions 314 and the left and right projection subassemblies 108L, 108R are respectively affixed to the outer ends of the affixation arm portions 314. This facilitates introduction of light beams respectively into the left and right eyepieces 70L, 70R, such that light rays respectively exit the left and right eyepieces 70L, 70R to display left and right monocular images as a binocular image to the user wearing the head mounted display device 100.

The left and right eyepieces 70L, 70R effectively operate as display interfaces when image data is projected onto them. In some implementations, the display of the left and right eyepieces (or displays) 70L, 70R may be an "optical see-through" display through which the user can directly view light from real objects via a transparent (or semi-transparent) element. In this case, the left and right eyepieces 70L, 70R, may be fully transparent or partially transparent such that each eyepiece can superimpose light from projection subsystems 108L, 108R over the user's view of the real world.

The display subsystem 104 is configured to present photo-based radiation patterns to each eye of the user. These radiation patterns are intended to be comfortably perceived as augmentations to physical reality, with high quality 2D or 3D image content.

The left and right projection subsystems 108L, 108R may project left and right monocular images on to the left and right eyepieces 70L, 70R, respectively. The eyepieces 70L, 70R can be placed in front of the eyes of the user to view the monocular images as a binocular image. In some cases, the eyepieces 70L, 70R are less than one inch from the user's eyes. In addition, the eyepieces 70L, 70R may be placed in the user's field of view between the eyes of the user and an ambient environment, such that direct light from the ambient environment travels through the eyepieces 70L, 70R to the eyes of the user.

The projection assemblies 108L, 108R may provide scanned light respectively to the eyepieces 70L, 70R. In some implementations, the projection subsystems 108L, 108R may be implemented as an optical fiber scan-based projection device, and the eyepieces 70L, 70R may be implemented as a waveguide-based display into which the scanned light from the respective projection subsystems 108L, 108R, is injected. The display subsystem 104 may output a sequence of frames obtained from a frame buffer at various frequencies. In some cases, the display subsystem 104 may output frames at a high frequency to provide the perception of a single coherent scene.

Each of the projection subsystems 108L, 108R may comprise a spatial light modulator ("SLM"), such as a liquid crystal on silicon ("LCoS") component, or a micro-electro-mechanical ("MEMs") scanning mirror. The left projection subsystem 108L may project light representative of virtual content toward left eyepiece 70L, which in turn in-couples and guides this light toward the diffractive optical elements (DOEs) configured to provide orthogonal pupil expansion (OPE) and/or exit pupil expansion (EPE) functionality. While a majority of the guided light may exit the eyepiece 70L as the light traverses the DOE(s) (e.g., directed toward a user's left eye), a portion of this light may continue on toward an out-coupling DOE 190L, where it may be coupled out of the eyepiece 70L as light (represented by the light ray 203) and at least partially intercepted by a light sensing assembly 122.

The right projection subsystem 108R, along with right eyepiece 70R and DOE(s) thereof (e.g., out-coupling element 190R, in-coupling element (ICE), OPE, and EPE), may operate in a similar manner to projection subsystem 108L. For example, the projection subsystem 108R, right eyepiece 70R, and DOE(s) thereof may present virtual content to a user's right eye, and out-couple and direct light representative of virtual content to the light sensing assembly 122 through the out-coupling DOE 190R.

As shown in FIG. 1A, the light sensing assembly 122 is located in the bridge 304 of the wearable frame 102. The light sensing assembly 122 includes a separate camera (imaging sensor) for the left and right eyepieces. The cameras are configured to determine the virtual content displayed on the left and right eyepieces.

The light sensing assembly 122 can be sufficiently rigid so the camera associated with the left eyepiece has a fixed position and orientation relative to the position and orientation of the camera associated with the right eyepiece. The light sensing assembly 122 is preferably made of a rigid material such as aluminum, titanium, or ceramic. The light sensing assembly 122 is also referred to as rigid sensing element. Both cameras of the light sensing assembly 122 are configured to capture light rays 203 representing images displayed on each respective eyepiece 70L, 70R. The light sensing assembly 122 includes temperature sensors to monitor the temperature for each camera. The light sensing assembly 122 is mounted to the wearable frame 102 elastically, preferably with an isolation material such as foam or rubber.

While the light sensing assembly 122 is described as a camera, in some cases, a position-sensing diode or LiDAR sensor is used instead of, or in addition to, the camera. For example, a LiDAR sensor can project a dense point cloud onto each respective eyepiece 70L, 70R, which is reflected back and analyzed by the processor to determine the relative position of the respective eyepieces 70L, 70R. Similarly, a position-sensing diode can measure the position of the light rays 203 and this information can be analyzed by the processor to determine the relative position of the respective eyepieces 70L, 70R.

The head mounted display device 100 and/or the VAR system may also include one or more sensors mounted to the wearable frame 102 for detecting the position and movement of the head of the user and/or the eye position and interocular distance of the user. Such sensor(s) may include image capture devices (such as cameras), microphones, inertial measurement units, accelerometers, compasses, GPS units, radio devices, and/or gyroscopes. For example, a blink sensor may indicate when the user blinks and this information can be used to trigger calibration processes by the VAR system.

The ends of the left and right cantilevered arms 310L, 310R away from the nose of the user includes cameras 103L, 103R, respectively. The left camera 103L and the right camera 103R are configured to obtain images of the user's environment, e.g., the objects in front of the user.

While FIG. 1A illustrates the left and right eyepieces 70L, 70R away from the user and the light sensing assembly 122 closer to the user, in some cases, the left and right eyepieces 70L, 70R are closer to the user and the light sensing assembly 122 is farther from the user.

Figure 2A:
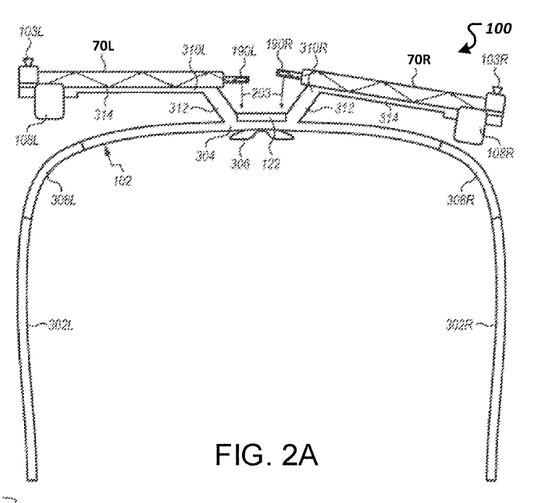
FIGS. 2A-2B depict a wearable frame for the head-mounted display in a deformed state.
Figure 2B:
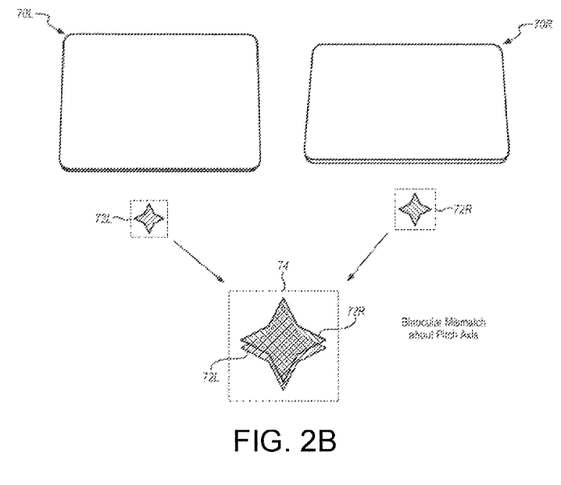

FIGS. 2A and 2B illustrates the head-mounted display device 100 of the VAR system in a deformed or non-ideal state. Eyepiece 70R is shown bent towards the user. When one or both eyepieces 70L, 70R are in the deformed state, the monocular virtual content 72L, 72R combines to produce binocularly-misaligned virtual content 74 as shown in FIG. 2B. FIG. 2B illustrates this misalignment of monocular virtual content 72L, 72R in the virtual content 74 due to a pitch of the right eyepiece 70R. The misalignment is represented by the non-perfectly overlapping left and right monocular virtual content 72L, 72R in the virtual content 74. Such misalignments between the left and right eyepieces 70L, 70R may result in perceived translational and/or rotational misalignments between left and right virtual content 72L, 72R.

The head-mounted display device 100 may be deformed during use, for example by movements of the head-mounted display device 100 or by accidental contact with the user's hands or other objects in the room. In some cases, the head-mounted display device 100 becomes deformed during transportation or even during initial assembly. As previously described, a slight 2 arc-minutes of one eyepiece 70L moving relative to the other eyepiece 70R can be enough to cause discomfort. This is true when the eyepieces 70L, 70R are semi-transparent or opaque (e.g., as in a virtual reality system). Accounting for this misalignment improves user comfort.

The systems and methods described allows the displays to be recalibrated to account for this deformation. This can be achieved by capturing light intended for the left and right eyes and comparatively sensing and correcting relative misalignments in virtual images.

FIGS. 1A and 2A illustrate the light rays 203 being transmitted from the left and right out-coupling DOEs 190L, 190R. In the undeformed state of FIG. 1A, the light rays 203 reach the respective cameras of the light sensing assembly 122 at substantially the same time. This time-of-flight information depends the relative position of the left eyepiece 70L relative to the right eyepiece 70R. For example, light reaching the display sooner than expected may indicate that the eyepiece is bent away from the user so that the out-couple DOE is closer to the light sensing assembly 122. Conversely, light reaching the display later than expected may indicate that the eyepiece is bent toward the user so that the out-couple DOE is farther from the light sensing assembly 122.

Furthermore, the images captured by the light sensing assembly 122 can be processed to determine information about the position of each respective eyepiece. The received light from the left out-coupling DOE 190L, is generated into a left captured image using the left camera of the light sensing assembly 122. The received light from the right out-coupling DOE 190R, is generated into a right captured image using the right camera of the light sensing assembly 122.

For example, by comparing the left captured image with a left target image representing the undeformed state, the VAR system can determine that the left eyepiece 70L is deformed. The VAR system can also determine a transformation to be applied to subsequent images for correcting for this deformation. The transformation is then applied to subsequent images for the left eyepiece and sent to the left projection subsystem 108L. The user resumes a comfortable viewing experience.

Features of the captured images can also indicate deformation. For example, a rotated image may indicate a roll of the eyepiece, a trapezoidal image may indicate yawing or pitching, depending on the length of the sides of the trapezoid. A larger image may indicate the eyepiece is farther from the light sensing assembly 122, while a smaller image may indicate the eyepiece is closer to the light sensing assembly.

Figure 3A:
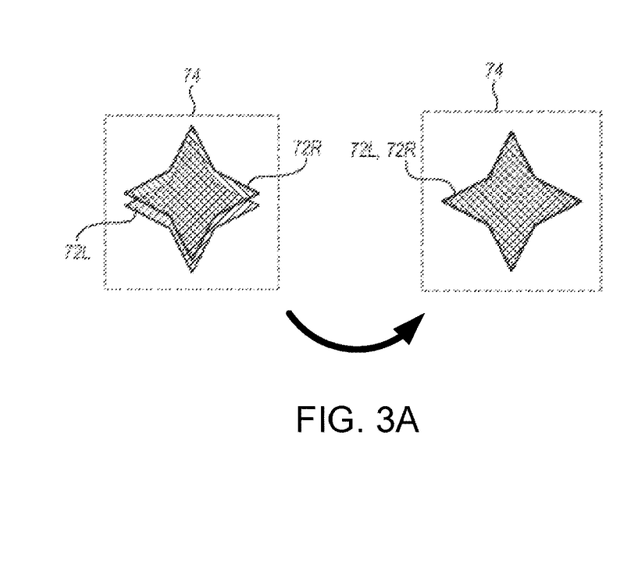
FIGS. 3A-3B illustrate the calibration process of the head-mounted display.
Figure 3B:
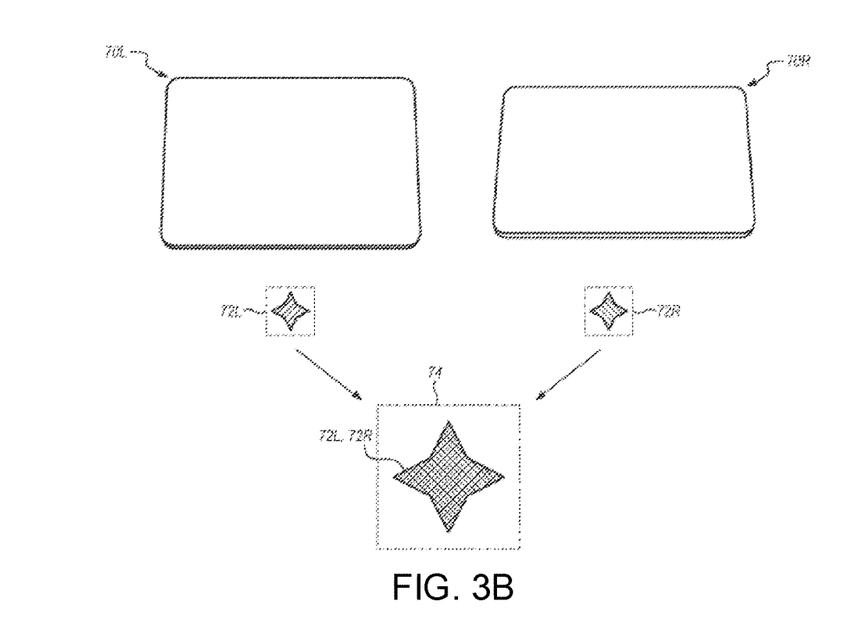

FIGS. 3A and 3B illustrate the transformation and calibration process associated with each eyepiece. The left figure of FIG. 3A illustrates the misaligned left and right monocular virtual content 72L, 72R from the pitching of the right eyepiece 70R as shown in FIG. 2B. Once transformed, the right monocular virtual content 72R perfectly overlays the left monocular virtual content 72L even though the right eyepiece 70R is still pitched (as shown in FIG. 3B). FIG. 3B illustrates that transformed images shown on the misaligned frame of FIG. 1B have a proper binocular representation after the transformation process.

Figure 4:
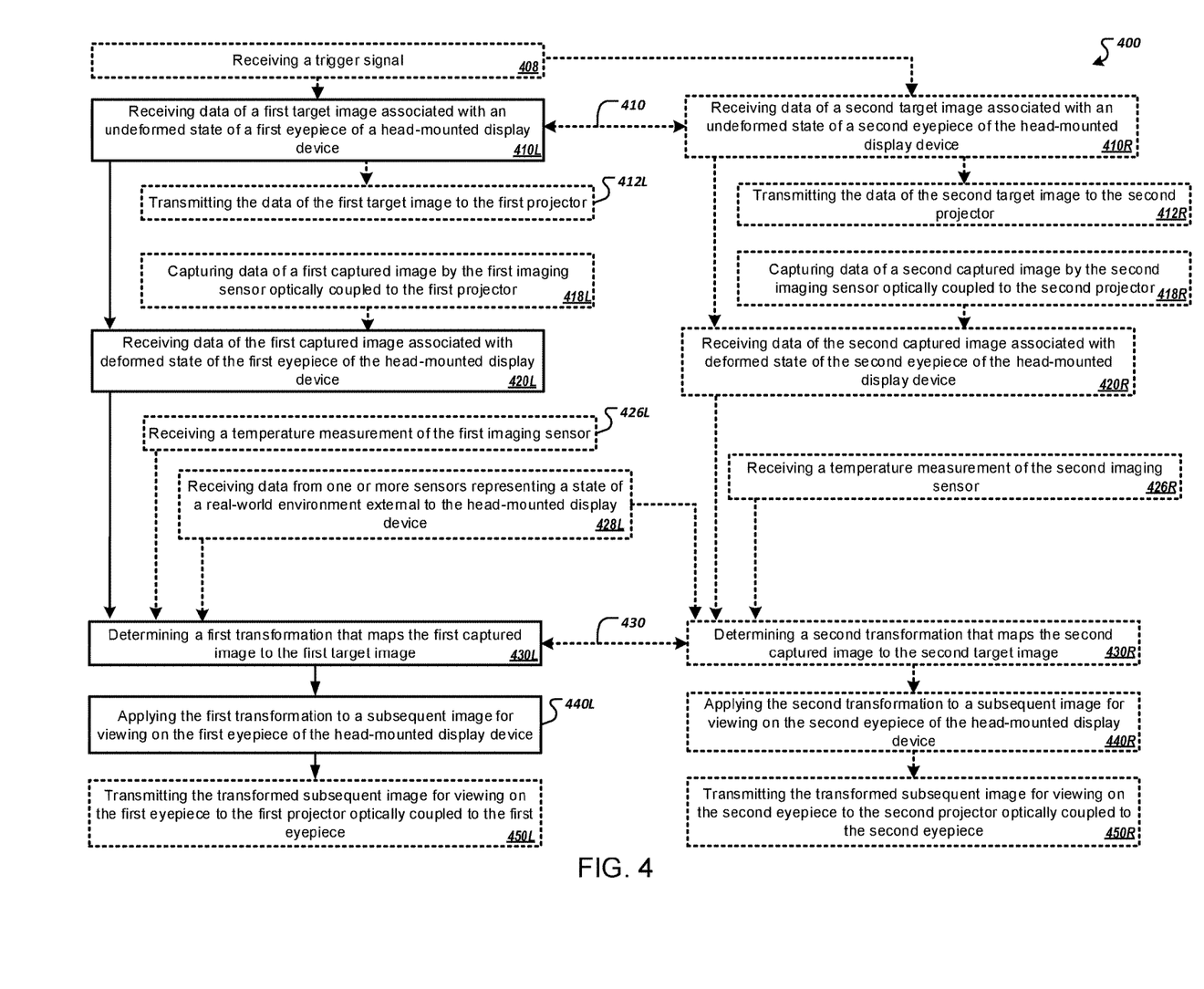
FIG. 4 is a flowchart of the calibration process for the head-mounted display.

FIG. 4 is a flowchart of the calibration process 400. The calibration is determined for each eyepiece 70L, 70R. In some cases, the calibration is triggered (e.g., by a user blinking) or by the user requesting a calibration be performed (e.g., through a user interface or via a setup mode) (step 408). The calibration is performed sufficiently fast so a user is not aware of the calibration processing occurring. In some cases, the calibration is completed within 100 milliseconds. In some cases, a separate trigger signal is received for each eyepiece.

In the context of the left (first) eyepiece, the VAR system receives data of a left target image associated with an undeformed state of the left eyepiece (step 410L). The left target image can be retrieved from a database of target images. The left target image may contain geometric features that are distinguishable by a processor of the VAR system. For example, the left target image may be a checkerboard pattern of squares with unique images in each square. The left target image may be monochrome or colored. The colored left target image can be used to indicate an alignment of color channels in an image (e.g., red, green, and blue color channels). The left target image may be tailored for the left eyepiece 70L and may be different than the right target image for the right eyepiece 70R. However, in some cases, the left target image and the right target image are identical.

In some cases, the data of the left target image is transmitted to the left projector for displaying on the left eyepiece (step 412L). The left camera of the light sensing assembly 122 captures light from the out coupling DOE representing data of a left captured image (step 418L). The data of the left captured image associated with deformed state is received from the left camera of the left eyepiece of the head-mounted display device (step 420L).

In some cases, the calibration process 400 includes receiving a temperature measurement of the left imaging sensor (step 426L). In some cases, data is received from one or more sensors representing a state of a real-world environment external to the head-mounted display device (step 428L).

A left transformation is determined that maps the left captured image to the left target image (step 430L). In some cases, the received temperature is accounted for in the left transformation. In some cases, the left transformation aligns features of a real-world environment with corresponding features from the left target image. In some cases, the left transformation accounts for a relative position of the left imaging sensor to the left eyepiece. In some cases, the left transformation is determined when a trigger signal associated with the left eyepiece is received, but the left transformation can also be determined when a trigger signal associated with the right eyepiece and/or both the left and the right eyepieces is received. In some cases, more than one trigger signal is received.

In some cases, the processor determines that virtual content is located in an upper left region of a frame and identifies the location of pixels and pixel values associated with content detected in a frame and uses this information to determine the transformation. In some cases, the direction of the light entering the imaging sensor is used to determine the transformation.

For example, the transformation matches a pixel in the display buffer. In this way, the video buffer and each pixel maps to a virtual light space and the transformation maps the pixels to the light sources resulting in a smooth transformation map. In some cases, it is preferable to have a couple dozen points (e.g., 15-30 points) across the image and a couple dozen points (e.g., 15-30 points) vertically. This enables the processor to determine where a pixel has moved in pixel space. For example, if the target image has a cluster of white pixels at location A and the cluster of white pixels has moved to location B, the transformation may be simply a pixel shift of the entire image from B to A (inverse shift). As another example, if the target image has a cluster of white pixels of size A and the cluster of white pixels has enlarged to size B, the transformation may be simply a pixel scaling of the entire image from size B to size A (inverse scaling). Other transformations follow from imaging processing techniques known in the art.

In some cases, more than one left transformation is determined. For example, several captured images can be processed to determine several transformations. These can be averaged or filtered to increase the accuracy of the transformation.

The left transformation is applied to a subsequent image for viewing on the left eyepiece of the head-mounted display device (step 440L). In some cases, the transformed subsequent image is transmitted for viewing on the left eyepiece to the left projector optically coupled to the left eyepiece (step 450L). In some cases, this process 400 is repeated as desired or needed.

In some cases, this process is repeated for the right (second) display. In such cases, data is received of a right target image associated with an undeformed state of a right eyepiece of the head-mounted display device (step 410R). In some cases, the right target image is the same as the left target image (step 410) or is otherwise dependent on the left target image. For example, if the left target image is monochrome, the right target image may also be monochrome. These and other properties of the target images may be communicated to each other by the processor (step 410). For example, the left and right transformation may align each individual color channel of the respective captured image with each individual color channel of the respective target image.

In some cases, the data of the right target image is transmitted to the right projector (step 412R). The data of a right captured image is captured by the right imaging sensor optically coupled to the right projector (step 418R). In some cases, the data of the right captured image associated with deformed state of the right eyepiece of the head-mounted display device is received (step 420R). In some cases, a temperature measurement of the right imaging sensor is received (step 426R).

The right transformation is determined that maps the right captured image to the right target image (step 430R). In some cases, the received temperature is accounted for in the right transformation. In some cases, the right transformation aligns features of a real-world environment with corresponding features from the right target image. In some cases, the right transformation accounts for a relative position of the right imaging sensor to the right eyepiece. In some cases, the right transformation is determined when a trigger signal associated with the right eyepiece is received, but the right transformation can also be determined when a trigger signal associated with the left eyepiece and/or both the left and the right eyepieces a received. In some cases, more than one trigger signal is received.

In some cases, the right transformation is dependent on the left transformation (step 430). For example, in some cases, a binocular transformation algorithm determines a favorable transformation for both the left transformation and the right transformation. The binocular transformation is not only determined in terms of left and right displays, but also in terms of one or more sensors on the head-mounted display device 100 or on the VAR system. The sensors are used to measure the real world around the user to properly align the superimposed visual content with the real world.

For example, consider the case where the left eyepiece is shifted 3 pixels to the left, but the objects in the real world are not properly aligned with either of the eyepieces. In this case, the left transformation may shift the image and the right transformation may shift the image so that both displays are aligned with each other and the real world surroundings.

The right transformation is applied to a subsequent image for viewing on the right eyepiece of the head-mounted display device (step 440R). In some cases, the transformed subsequent image is transmitted for viewing on the right eyepiece to the right projector optically coupled to the right eyepiece (step 450R).

Figure 5:
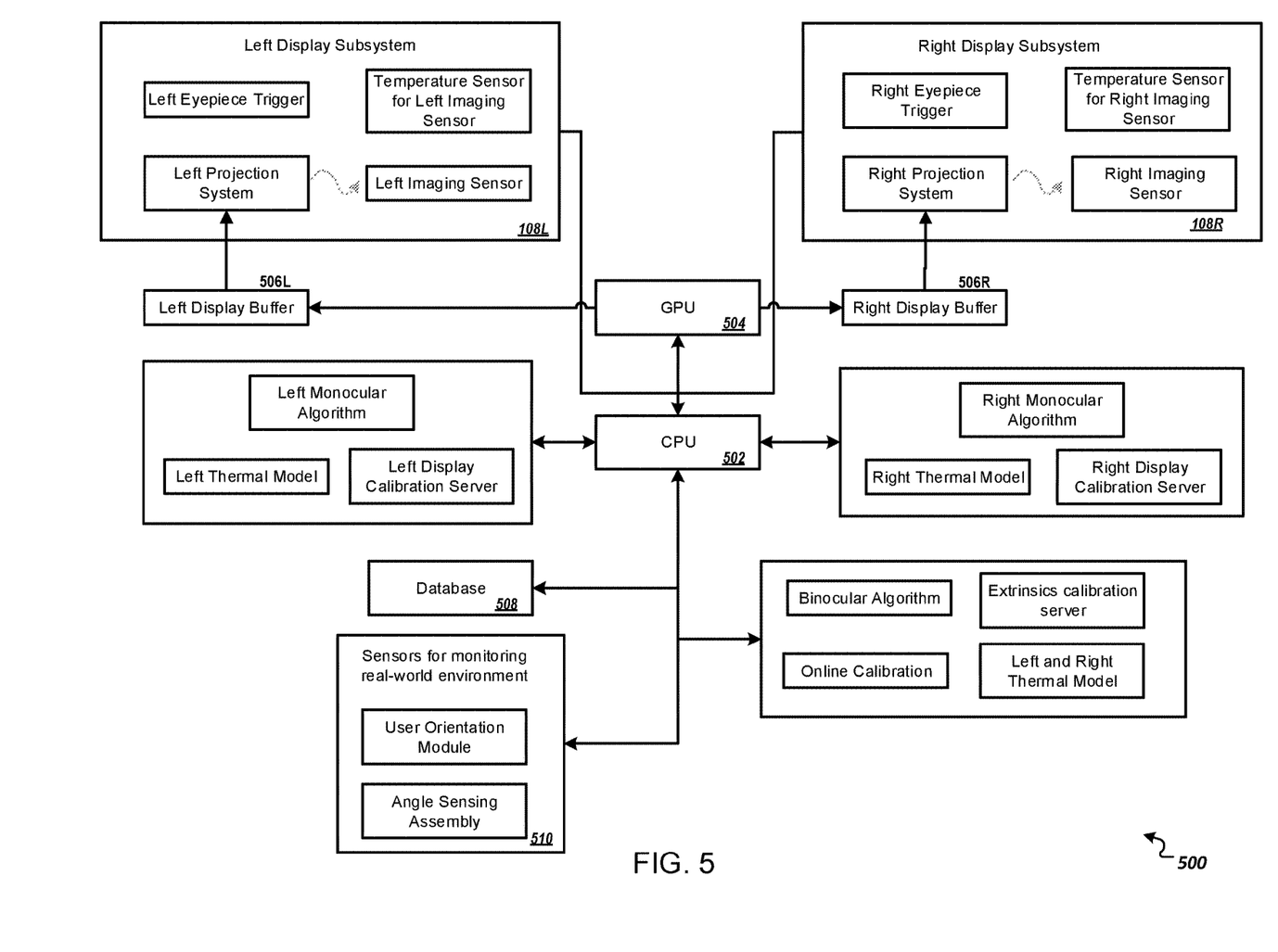
FIG. 5 is a system diagram of the head-mounted display.

FIG. 5 is a system diagram of a VAR system 500. The VAR system 500 includes a control subsystem with various software and hardware components and includes the head-mounted display device 100 shown in FIGS. 1A and 2A. The VAR system 500 includes a computer processing unit (CPU) 502 and a graphics processing unit (GPU) 504 for performing the processing tasks of the VAR system 500. Left and right monocular calibration algorithms and left and right thermal models are stored in memory and executed on the processors to assist in the calibration process.

In some cases, the left monocular calibration algorithm includes the calibration process 400 steps 410L-450L and the right monocular calibration algorithm includes the calibration process 400 steps 410R-450R, but this is not limiting. Other steps of the calibration process 400 are implementable in the left and right monocular calibration algorithms. Left and right display calibration servers are also in communication with the processors. Furthermore, the binocular calibration algorithm, online calibration, an extrinsic calibration server, and left and right combined thermal models are in communication with the processor for the calibration process. In some cases, the binocular calibration algorithm includes the calibration process 400 steps 410 and 430, but this is not limiting. Other steps of the calibration process 400 are implementable in the binocular calibration algorithm.

The VAR system 500 includes the sensors for monitoring the real-world environment 510. These sensors 510 are shown to include a user orientation sensor and an angle sensing assembly, but the previously describes sensors are also included with the VAR system 500. The VAR system 500 also includes a three-dimension (3D) database 508 for storing 3D scene data. The CPU 502 may control the overall operation of the VAR system 500, while the GPU 504 renders frames (e.g., translating a 3D scene into a 2D image) from the 3D data stored in the 3D database 508 and stores these frames in the frame buffer(s) 506.

Left and right frame buffers 506L, 506R are also included which transmit images to the left and right projection subsystems 108L, 108R, respectively. In particular, the image is sent to the projection system and displayed on the eyepiece of the head-mounted display 100. Once captured by the left and right image sensors of the light sensing assembly 122, the captured images are sent back to the processor as part of the calibration process.

In general, the control subsystem may include various controllers such as microcontrollers, microprocessors, CPUs, digital signal processors, GPUs, application specific integrated circuits (ASICs), programmable gate arrays (PGAs), field PGAs (FPGAs), and/or programmable logic controllers (PLUs). The control subsystem may include and/or communicates with one or more processors, such as the CPU 502 and GPU 504, that perform the operations described in this specification, e.g., through execution of executable instructions. While not illustrated, one or more integrated circuits may be used to control the reading into and/or reading out of one or more frames from the frame buffers 506L and 506R and the operations of the left and right projection subsystems 108L, 108R of the display subsystem 104.

In particular, the CPU 502 may receive and process data obtained by the light sensing assembly 122. The CPU 502 may compare the data derived from the light incident on the light sensing assembly 122 when the wearable frame 102 is in the undeformed state with the data derived for the light incident on the light sensing assembly 122 when the wearable frame 102 is in the deformed state, and determine a relative deformational state of the left and right eyepieces 70L, 70R. In response to detecting the relative deformational state or the misalignment of virtual images, the VAR system 500 may perform one or more calibration procedures to compensate the virtual or displayed images according to the deformation/misalignment.

The VAR system 500, and the various techniques disclosed herein, may also be employed in applications other than augmented reality and virtual reality subsystems. While certain implementations are described in the context of an augmented reality subsystem or virtual reality subsystem, the VAR system 500 is not limited to such subsystems.

In some cases, the processing aspects (CPU 502 and GPU 504) of the VAR system 500 are implemented in a device attached to the user's waist, or in the user's pocket, but in some cases, the processing aspects are implemented directly in the head-mounted display device 100 shown in FIGS. 1A and 2A. In some cases, the processing aspects are implemented in a computer nearby and either wired or wirelessly communicated to the head-mounted display device 100. In some cases, at least some processing aspects are implemented on a remote server and wireless communicated to the head-mounted display device 100 shown using WiFi or similar.

The calibration technique may be executed by one or more processors (referred to herein below simply as processor) such as the CPU 502 or GPU 504. While the calibration process previously described is described in the context of a single captured image, in some cases, more than one captured image is processed and more than one transformation is determined for each eyepiece. In this case, the transformations can be averaged or filtered to determine the most accurate transformation.

In some implementations, the VAR system 500 may be calibrated for the colors of virtual content being displayed to the user. For example, if only blue virtual content is being displayed, then the processor may use a blue test pattern to perform calibration. If only red virtual content is being displayed, then the processor may use a red test pattern to perform calibration. If only green virtual content is being displayed, then the processor may use a green test pattern to perform calibration. If virtual content having a combination of red, blue, and green colors is being displayed, then the processor may perform calibration using a combination of red, blue, and green calibration frames.

Various characteristics, such as the intensity, of the calibration frame may be configured to match or resemble the characteristics of the representative virtual content frame. For example, if the intensity of the virtual content is determined to be greater than or equal to a minimum threshold level of intensity, then the intensity of the calibration frame may be equal to that of the corresponding virtual content. If the intensity of the virtual content is determined to be less than the minimum threshold level of intensity, then the intensity of the calibration frame may be set to the minimum threshold level of intensity.

In some implementations, image properties of the calibration frame, such as the contrast ratio or brightness, could be configured to further reduce the perceptibility of test frames. In some implementations, the calibration frame may be diluted by hiding the test image behind edges of the virtual content. The calibration frame may be further camouflaged by using texture and color similar to the virtual content.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented using one or more computer programs or non-transitory computer-readable storage media that includes instructions that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example, semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

Computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program, also known as a program, software, software application, script, plug-in, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a VAR system, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may, in some cases, be excised from the combination, and the claimed combination may be directed to a sub-combination or variation of a sub-combination. For example, although the mapping operation is described as a series of discrete operations, the various operations may be divided into additional operations, combined into fewer operations, varied in order of execution, or eliminated, depending on the desired implementation.

Similarly, the separation of various system components in the embodiments described above should not be understood as requiring such separation in all embodiments, and it should be understood that the described program components and systems may generally be integrated together in a single software product or packaged into multiple software products. For example, although some operations are described as being performed by a processing server, one of more of the operations may be performed by the smart meter or other network components.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

What is claimed is:

1. A computer-implemented method comprising:
    transmitting data of a first target image that is associated with an undeformed state of a first eyepiece of a head-mounted display device to a first projector that is optically coupled to the first eyepiece;
    capturing the data of the first target image that is associated with the undeformed state of the first eyepiece of the head-mounted display device by a first imaging sensor that is optically coupled to the first projector and that is part of the head-mounted display device;
    receiving data of a first captured image that is associated with deformed state of the first eyepiece of the head-mounted display device, the first captured image representing a transformed state of the first target image and being received by the first imaging sensor that is optically coupled to the first projector of the first eyepiece;
    determining a first transformation that maps the first captured image to the first target image; and
    applying the first transformation to a subsequent image for viewing on the first eyepiece of the head-mounted display device.

2. The computer-implemented method of claim 1, further comprising:
    transmitting the transformed subsequent image to the first projector optically coupled to the first eyepiece.

3. The computer-implemented method of claim 1, further comprising:
    receiving a temperature measurement of the first imaging sensor; and
    accounting for the received temperature measurement in the first transformation.

4. The computer-implemented method of claim 1, further comprising:
    receiving data from one or more sensors representing a state of a real-world environment external to the head-mounted display device,
    wherein the first transformation aligns features of the real-world environment with corresponding features from the first target image.

5. The computer-implemented method of claim 1, wherein the first transformation aligns each individual color channel of the first captured image with each individual color channel of the first target image.

6. The computer-implemented method of claim 1, further comprising:
receiving a trigger signal,
wherein determining the first transformation is responsive to receiving the trigger signal.

7. The computer-implemented method of claim 1, wherein the first eyepiece of the head-mounted display device is optically transparent and wherein the first transformation accounts for a relative position of the first imaging sensor to the first eyepiece.

8. The computer-implemented method of claim 1, further comprising:
receiving data of a second target image associated with an undeformed state of a second eyepiece of the head-mounted display device, the second eyepiece comprising a second projector that is optically coupled to the second eyepiece;
receiving data of a second captured image associated with deformed state of the second eyepiece, the second captured image representing a transformed state of the second target image and is received by a second imaging sensor optically coupled to a second projector of the second eyepiece, the second imaging sensor being part of the head-mounted display device;
determining a second transformation that maps the second captured image to the second target image; and
applying the second transformation to a subsequent image for viewing on the second eyepiece of the head-mounted display device.

9. The computer-implemented method of claim 8, wherein the first transformation is dependent on the second transformation and wherein the second transformation aligns subsequent images for viewing on the second eyepiece with subsequent images for viewing on the first eyepiece.

10. The computer-implemented method of claim 8, wherein the first imaging sensor is rigidly connected to the second imaging sensor and wherein the first eyepiece and the second eyepiece are deformable relative to the first imaging sensor and the second imaging sensor.

11. The computer-implemented method of claim 8, wherein the second transformation accounts for a relative position of the second imaging sensor relative to the second eyepiece.

12. The computer-implemented method of claim 8, further comprising:
receiving a temperature measurement of the second imaging sensor; and
accounting for the received temperature measurement in the second transformation.

13. A head-mounted display device comprising:
a wearable frame;
a first eyepiece elastically mounted to the wearable frame, the first eyepiece comprising a first projector rigidly and optically coupled to the first eyepiece, the first projector being configured to emit light to the first eyepiece;
a first imaging sensor elastically mounted to the wearable frame and configured to capture emitted light from the first eyepiece;
a processor communicatively coupled to the first projector and the first imaging sensor, the processor configured to:
transmit data of a first target image that is associated with an undeformed state of the first eyepiece of the head-mounted display device to the first projector that is optically coupled to the first eyepiece;
capture the data of the first target image that is associated with the undeformed state of the first eyepiece of the head-mounted display device by the first imaging sensor that is optically coupled to the first projector and that is part of the head-mounted display device;
receive data from the first imaging sensor of a first captured image representing a transformed state of the first target image;
determine a first transformation that maps the first captured image to the captured data of the first target image; and
apply the first transformation to a subsequent image for viewing on the first eyepiece of the head-mounted display device.

14. The head-mounted display device of claim 13, further comprising:
one or more sensors associated mounted to the wearable frame and configured to receive data regarding a state of a real-world environment external to the head-mounted display device, wherein the first transformation aligns features of the real-world environment with corresponding features from the first target image.

15. The head-mounted display device of claim 13, further comprising:
a temperature sensor configured to measure a temperature of the first imaging sensor, and wherein the first transformation is based, at least in part, on the measured temperature of the first imaging sensor, and
a trigger sensor configured to transmit a signal to the processor for initiating the process performed by the processor,
wherein the first eyepiece is optically transparent.

16. The head-mounted display device of claim 13, further comprising:
a second eyepiece elastically mounted to the wearable frame, the second eyepiece comprising a second projector rigidly and optically coupled to the second eyepiece, the second projector being configured to emit light to the second eyepiece;
a second imaging sensor elastically mounted to the wearable frame and configured to capture emitted light from the second eyepiece, and
wherein the processor is further configured to:
transmit data of a second target image to the second projector;
receive data from the second imaging sensor of a second captured image representing a transformed state of the second target image;
determine a second transformation that maps the second captured image to the second target image; and
apply the second transformation to a subsequent image for viewing on the second eyepiece of the head-mounted display device.

17. The head-mounted display device of claim 16, wherein the second transformation aligns features of a real-world environment with corresponding features from the second target image and wherein the second transformation is dependent on the first transformation.

* * * * *